Figure 1:
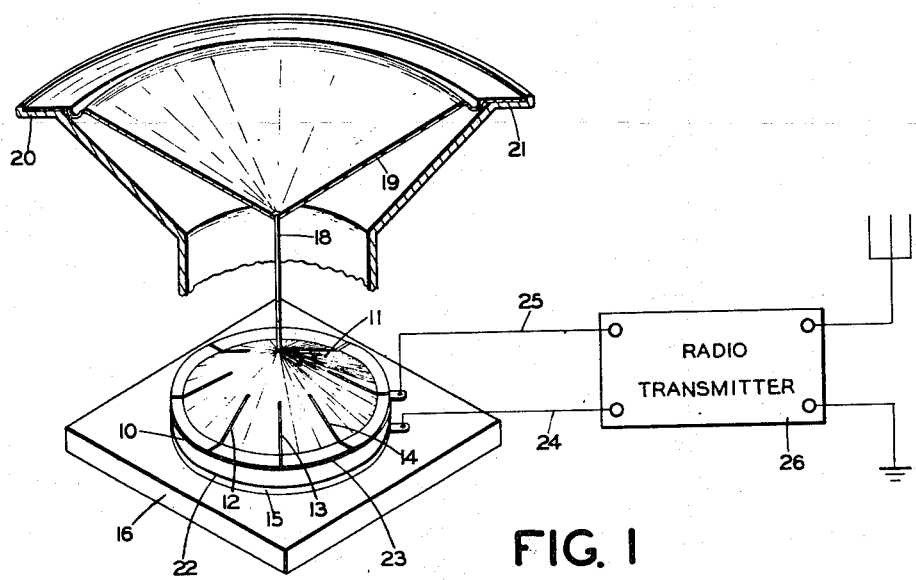

Nov. 15, 1949 — J. P. ARNDT, JR — 2,487,962

ELECTROMECHANICAL TRANSDUCER

Filed Aug. 29, 1947 — 2 Sheets-Sheet 1

INVENTOR.
JOHN P. ARNDT JR.
BY
ATTORNEY

Nov. 15, 1949  J. P. ARNDT, JR  2,487,962
ELECTROMECHANICAL TRANSDUCER
Filed Aug. 29, 1947  2 Sheets-Sheet 2

INVENTOR.
JOHN P. ARNDT, JR.
BY
ATTORNEY

Patented Nov. 15, 1949

2,487,962

UNITED STATES PATENT OFFICE 2,487,962

ELECTROMECHANICAL TRANSDUCER

John P. Arndt, Jr., Euclid, Ohio, assignor to The Brush Development Company, Cleveland, Ohio, a corporation of Ohio Application August 29, 1947, Serial No. 771,277

11 Claims. (Cl. 171—327)

1

The subject matter of this invention relates generally to electro-mechanical transducers for converting mechanical energy to electrical energy or for converting electrical energy to mechanical energy. Specifically, the invention relates to a transducer of the type under consideration for converting as between electrical and mechanical energy, or vice versa, and which utilizes a transducing element in which mechanical strains in at least two coordinate directions therein are related, in the same sense, to a resultant electric field in another coordinate direction in the element or vice versa.

Electro-mechanical transducers are well-known in the art and have been widely used commercially. Many of such transducers have used an element, or a combination of elements, of Rochelle salt as the actuating element thereof. However, while Rochelle salt has many very desirable properties as a transducing material, it also has some properties which render its use difficult and, at least under some conditions, impractical. Thus, for example, Rochelle salt crystals are soluble in water and must be protected, in most installations, by a waterproof coating. Also, Rochelle salt crystals lose their transducing properties when heated only slightly above normal room temperatures and this characteristic has imposed restrictions upon the use of Rochelle salt as the operating element of electro-mechanical transducers in many applications.

It is now known that under certain conditions a ceramic material of barium titanate, or of barium titanate which includes a substantial amount of strontium titanate, has electro-mechanical transducing properties. Thus, in the copending application for United States Letters Patent, Serial No. 740,460, filed on April 9, 1947 in the name of Hans Jaffe and assigned to the same assignee as the instant invention, various electro-mechanical transducers using titanate materials are disclosed. Inasmuch as materials of this type are substantially impervious to water and inasmuch as their operation as electro-mechanical transducers is very effective over wide temperature ranges, their use as transducing materials is very desirable in many applications.

In utilizing electro-mechanical transducers generally, many different types of lever arrangements or mechanical coupling devices have been used therewith. Plates taken from certain cuts of Rochelle salt crystals, for example, have the property of expanding in one coordinate direction and contracting in the other coordinate direction at right angles thereto when an electric field is applied in a coordinate direction through the plate. Certain prior electro-mechanical transducers which have been widely used have comprised arrangements designed to utilize the above-mentioned movements in both of the coordinate directions in the normal operation of the device. Thus in United States Letters Patent, Re. 20,680 granted March 29, 1938 on the application of Charles B. Sawyer and assigned to the same assignee as the present invention, there is described and claimed a so-called "twister" element comprising two plates of Rochelle salt cemented together in such a manner that, when the element is used, an expansion in one of the plates is effected and a corresponding contraction in the other plate is effected. When such an element is used as the operating element of an electro-mechanical transducer, the above-mentioned expansion in one coordinate direction and simultaneous contraction in another coordinate direction at right angles thereto in each of the crystal plates are better utilized and provide a very efficient transducer actuating element.

Also it has been proposed to utilize a single plate of Rochelle salt as the operating element in an electro-mechanical transducer and to associate therewith a lever arrangement in such manner that the above-mentioned expansion and contraction in normal coordinate directions are both used to actuate, or to be actuated by, the lever system.

However, transducing elements of the type mentioned above which comprise titanate materials do not have the same operating properties as the characteristics described above as the operating properties of certain Rochelle salt plates. As described in the above-identified copending application of Hans Jaffe, a disk of titanate material, when electroded on both faces and excited by suitable voltages applied thereto, expands or contracts radially in the same manner in all directions in the disk. It would be very desirable, therefore, to provide a lever arrangement or an arrangement for applying mechanical energy to, or for receiving mechanical energy from, a transducing element of titanate material which utilizes the above-mentioned expansion and contraction properties of the titanate material in more than one direction within the material.

It is an object of the present invention to provide an improved electro-mechanical transducer.

It is another object of the invention to provide an improved electro-mechanical transducer which is not subject to one or more of the above-mentioned disadvantages of prior electro-mechanical transducers.

It is still another object of the invention to provide an improved electro-mechanical transducer comprising an operating element of ceramic material.

In accordance with the invention, an electro-mechanical transducer comprises an element having electro-mechanical transducing properties in the same sense as between mechanical strains in the element in at least two coordinate directions and a resultant electric field in another coordinate direction, and vice versa. There is also provided an element having spaced points in at least each of the two above-mentioned coordinate directions affixed to corresponding points of said first-mentioned element and forming a two-dimensional bow therewith. Mounting means are provided for one of the elements and a drive means is affixed to the other of the elements at a point between the above-mentioned spaced points. Alternating-current signal-translating means are connected to two opposing faces of the first-mentioned element for translating currents associated with the above-mentioned mechanical strains and electric field.

For a better understanding of the present invention together with other and further objects thereof, reference is had to the following description taken in connection with the accompanying drawings and its scope will be pointed out in the appended claims.

Figure 2:
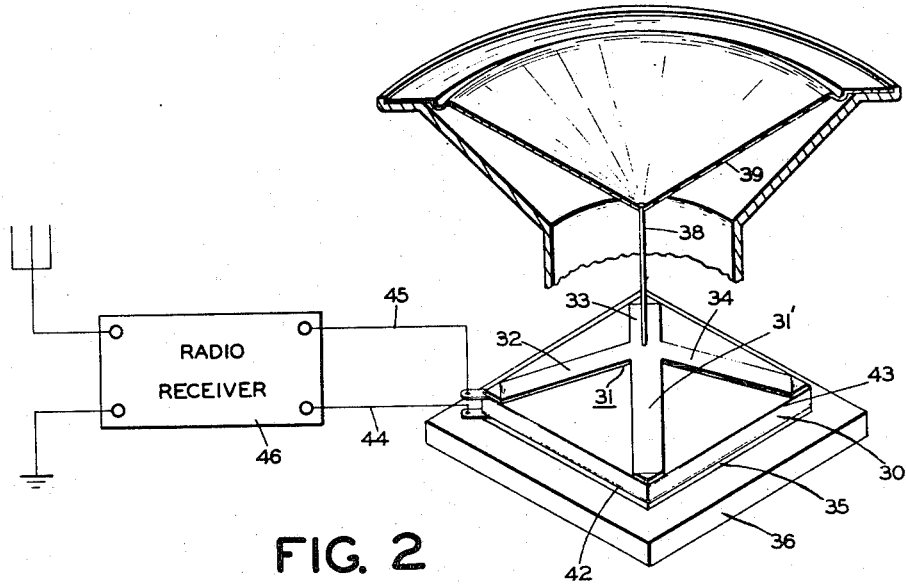
Figure 3:
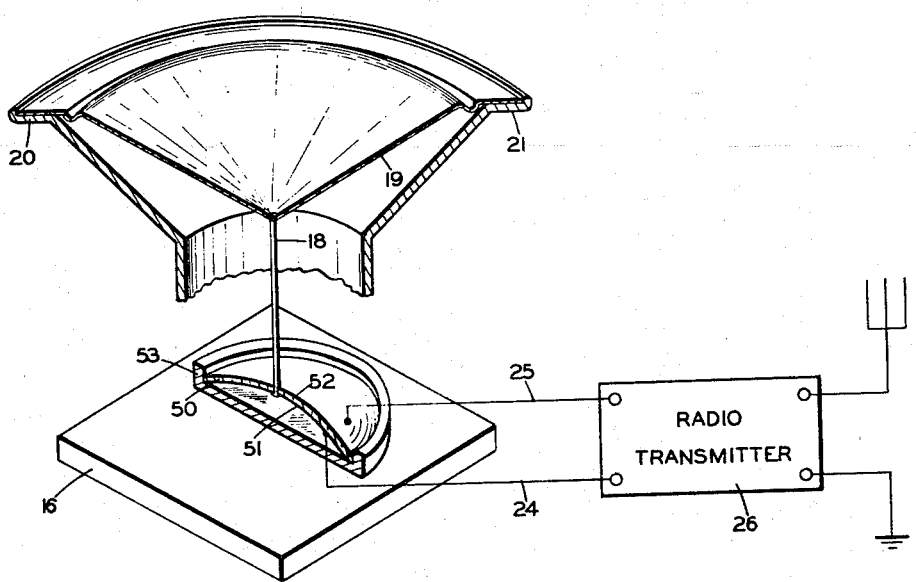
Figure 4:
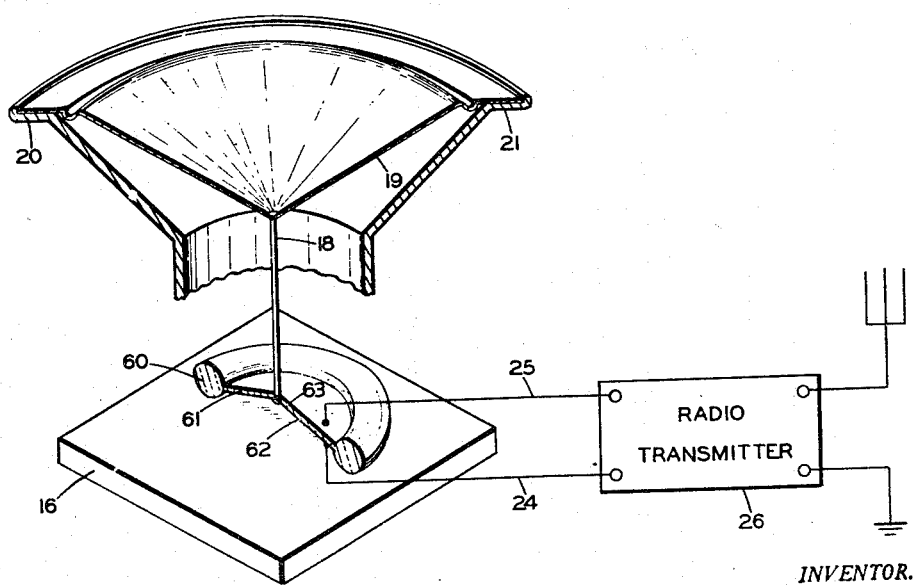

Fig. 1 of the drawings illustrates an electro-mechanical transducer in accordance with the invention used as the transducing element of a microphone; Fig. 2 illustrates a modification of the Fig. 1 arrangement in which the transducing element is used as the actuating element of a loudspeaker; while Figs. 3 and 4 illustrate different embodiments of the transducer element of the invention utilized as the transducing element of a microphone.

Referring now to Fig. 1, the electro-mechanical transducer there shown comprises an element 10 in the form of a disk having electro-mechanical transducing properties in the same sense as between mechanical strains in the element in at least two coordinate directions and a resultant electric field in another coordinate direction, and vice versa. Preferably, the element 10 is comprised of barium titanate material including a substantial portion of strontium and which has been polarized to respond in a linear mode to an alternating field applied thereto. However, any of the materials described in the above-identified Jaffe application are suitable for use in transducer elements in accordance with the present invention.

The transducer of Fig. 1 also comprises an element 11 having spaced points in at least two of the above-mentioned coordinate directions affixed to corresponding points of the element 10 in order to form with the element 10 a two-dimensional bow. Specifically, the element 11, in the arrangement illustrated, comprises a metal cone having its rim affixed to the disk of the titanate material 10 as by cementing or clamping. In order to eliminate some of the stiffness that the cone 11 would otherwise have, a plurality of slits 12, 13 and 14 etc., may be provided in the cone beginning at its rim and extending well in towards the apex of the cone.

The transducer element 10 of Fig. 1 is mounted by means of a thin rubber pad 15 to a solid support 16 which may comprise a portion of the cabinet or container within which the transducer is mounted. For the sake of simplicity, only the small section 16 of the cabinet or support is shown. The element 10 is affixed to the rubber pad 15 by cementing and the pad 15 is in turn cemented to the support 16.

Drive means are affixed to the member 11 at the apex of the cone. As shown, this comprises a drive pin 18 connected to the diaphram 19 of a microphone, the rim of the diaphram 19 being affixed to some fixed member such as a part of the structure of the cabinet as indicated at 20, 21. Alternating-current signal-translating means are connected to two opposing faces of the element 10 for translating electrical currents associated with the above-mentioned mechanical strains and electric fields. Specifically this last-named means comprises a metal electrode 22 on the bottom face of the disk 10, and between the the disk 10 and the rubber mounting pad 15, and a metal electrode 23 on the upper face of the disk 10. Electrodes 22 and 23, respectively, are connected by conductors 24 and 25 to the input terminals of a radio transmitter 26.

In considering the operation of the transducer of Fig. 1, reference is again made to the fact that a disk of properly polarized titanate material having potentials applied to the face thereof tends to expand or contract, depending upon the polarity of the applied potential, in all radial directions. This property is explained in full in connection with the description of Fig.1 of the above-identified Jaffe application. The property just mentioned is a reciprocal one and radial stresses, applied in the same sense in a number of directions in the disk 10, cause corresponding potentials or components of potentials to be present between electrodes 22 and 23. It is here assumed that the titanate material 10 has been polarized to respond in the linear mode to an alternating field applied thereto. This may be done, for example, by applying thereto a uni-directional polarizing voltage of large magnitude as explained in the above-identified Jaffe application. However, some titanate materials have the property of retaining this polarization even after the above-mentioned uni-directional potential has been removed. Regardless of the manner in which it is done, it will be assumed that the disk 10 has this polarized property. Under the conditions stated, sound waves incident upon the diaphragm 19 cause vibratory movements of the apex of the cone 11 and, due to the stiffness of the metal member 11, these movements apply radial contraction or expansion forces to the material of the titanate disk 10. As a result of these expansion or contraction forces, electrical potentials are developed between the electrodes 22 and 23 which are in turn applied to the input circuit of the radio transmitter 26. These potentials are utilized in the transmitter to modulate the high-frequency signal which is radiated from the antenna of the transmitter in a manner which, per se, is well understood by those skilled in the art.

The mounting arrangement comprising base 16, the rubber pad 15, and the disk 10 is described and claimed in United States application for Letters Patent Serial No. 771,198, filed August 29, 1947, in the name of Charles K. Gravley and assigned to the same assignee as the present invention, which issued as Patent No. 2,477,596 on August 2, 1949.

The transducer of Fig. 2 is utilized as the drive member of a loudspeaker and is generally similar to the transducing member of Fig. 1. Elements of the Fig. 2 embodiment which correspond to those of the Fig. 1 embodiment bear similar reference numerals in the 30-series. Thus, the transducer of Fig. 2 comprises an actuating element of titanate material 30 and a metal member 31 corresponding generally to the actuating element 10 and to the cone 11, respectively, of the Fig. 1 embodiment. However, in the Fig. 2 arrangement, the element 30 is in the form of a square plate and the element 31 comprises only four arms 31', 32, 33, 34 which are affixed to the corners of the square of material 30 in a manner similar to that described in connection with Fig. 1 to form a two-dimensional bow. The arrangement of Fig. 2 comprises a rubber pad 35 by which the disk 30 is mounted upon the stationary member 36, a drive pin 38, and a diaphragm 39. Electrodes 42 and 43 are provided, respectively, on the lower and upper faces of the plate 30 and conductors 44 and 45 are utilized to connect the output terminals of a radio receiver 46 to electrodes 42 and 43, respectively.

The operation of the element of Fig. 2 will be readily apparent from the description which has been given above with reference to Fig. 1. Specifically, the audio components of a signal which are received by radio receiver 46 are applied to electrodes 42 and 43 and cause the diagonals of the block 30 simultaneously to contract or simultaneously to expand, depending upon the polarity of the applied potentials. This expansion or contraction causes the drive pin 38 to be actuated, thereby to drive the diaphragm 39 and to produce audible signals.

The metal arm structure 31 of Fig. 2 can be thought of as being analogous to the cone 11 in which large sections of the cone are removed thereby to leave only the arms 31', 32, 33 and 34. It will be seen, therefore, that, when electrical signals are applied to the electrodes 42 and 43, electro-mechanical transducing properties are present in the same sense in two coordinate directions of the material of the plate 30. Therefore, each of these mechanical strains aids in driving the diaphragm 39.

The arrangement of Fig. 3 is generally similar to that of Fig. 1 and circuit elements which are similar bear identical reference numerals. However, in the Fig. 3 embodiment of the invention, the transducing element comprises a member 50 of titanate material of cup-shape which is provided with an electrode 51 on its lower surface and an electrode 52 on its upper surface. A restraining member 53 is provided for the operating member 50 and is also of cup-shape having a lip which is effective to engage the rim of the cup 50.

In considering the operation of the Fig. 3 embodiment, it will be seen that, when pressure is applied to the drive pin 18, corresponding radial strains in all directions are effected within the cup of titanate material 50. These strains cause voltages to appear between the electrodes 51 and 52 which are utilized in the manner described above in connection with the description of the operation of the Fig. 1 embodiment.

It will be seen that the element 50 of Fig. 3 also has electro-mechanical transducing properties in the same sense as between mechanical strains in the element in at least two coordinate directions (namely, in all radial directions in the cup 50) and a resultant electric field in another coordinate direction (namely, the electric field between the electrodes 51 and 52). It will also be seen that the element 53 has spaced points in at least each of the two above-mentioned coordinate directions (actually in all radial directions in the cup 50) affixed to corresponding points of the cup 50 thereby forming therewith a two-dimensional bow.

The arrangement of Fig. 4 is also generally similar to that of Fig. 1 and corresponding elements bear identical reference numerals. The arrangement of Fig. 4 differs from Fig. 1 in that a single structure of titanate material 60 provides the transducing element and the element for restraining it. Specifically, the element 60 comprises a rather heavy rim in the shape of a toroid which has a thin diaphragm member 61 within the toroid. The diaphragm member 61 is bowed so that it has the form of a cone and an electrode 62 is applied to one side thereof while an electrode 63 is applied to the other side thereof.

Considering the operation of the Fig. 4 embodiment of the invention, it will be seen that, when drive pin 18 is moved downwardly, radial stresses in all directions are applied to the diaphragm 61 and that, in accordance with the principles outlined above a corresponding voltage is present at electrodes 62 and 63. Accordingly, vibratory motions of the drive pin 18 cause corresponding potential variations to be applied to the input circuit of the radio receiver so that the carrier which is radiated is modulated accordingly.

It will be seen that the Fig. 4 embodiment also has an element (namely, the diaphragm 61) which has electro-mechanical transducing properties in the same sense as between mechanical strains in the element in at least two coordinate directions and a resultant electric field in another coordinate direction. Specifically, mechanical strains caused by the drive pin 18 exist in all radial directions in the disk or diaphragm 61 and all such strains result in electric field components in the same sense being induced, so that corresponding potentials are present between electrodes 62 and 63. The arrangement of Fig. 4 includes an element (namely, the toroidal rim) which has spaced points in at least each of the two above-mentioned coordinate directions affixed to corresponding points of the diaphragm 61 and forming a two-dimensional bow therewith. Specifically, points corresponding to all radial directions of the diaphragm 61 are connected to the heavy rim portion of the member 60.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. An electro-mechanical transducer comprising: an element having electro-mechanical transducing properties in the same sense as between mechanical strains in said element in at least two coordinate directions and a resultant electric field in another coordinate direction, and vice versa; an element having spaced points in at least each of said two coordinate directions affixed to corresponding points of said first-mentionel element and forming a two-dimensional bow therewith; mounting means for one of said elements; drive means affixed to the other of said elements at a point between said spaced points; and alternating-current signal-translating means coupled to two opposing faces of said first-mentioned element for translating currents associated with said mechanical strains and electric field.

2. An elecro-mechanical transducer comprising: an element having electro-mechanical transducing properties in the same sense as between mechanical strains in said element in at least two coordinate directions and a resultant electric field in another coordinate direction, and vice versa; an element having spaced points in at least two said coordinate directions affixed to corresponding points of said first-mentioned element and forming a two-dimensional bow therewith; mounting means for said element having transducing properties; drive means affixed to the other of said elements at a point between said spaced points; and alternating-current signal-translating means connected to two opposing faces of said first-mentioned element for translating currents associated with said mechanical strains and electric field.

3. An electro-mechanical transducer comprising: an element having electro-mechanical transducing properties in the same sense as between mechanical strains in said element in at least two coordinate directions and a resultant electric field in another coordinate direction, and vice versa; an element having spaced points in at least each of said two coordinate directions affixed to corresponding points of said first-mentioned element and forming a two-dimensional bow therewith; mounting means for said last named element; drive means affixed to said element having transducing properties at a point between said spaced points; and alternating-current signal-translating means connected to two opposing faces of said first-mentioned element for translating currents associated with said mechanical strains and electric field.

4. An electro-mechanical transducer comprising: an element having electro-mechanical transducing properties in the same sense as between mechanical strains in said element in at least two coordinate directions and a resultant electric field in another coordinate direction; an element having spaced points in at least said two coordinate directions affixed to corresponding points of said first-named element and forming a two-dimensional bow therewith; mounting means for one of said elements; drive means affixed to the other of said elements at a point between said spaced points for applying mechanical strains in at least said two coordinate directions to said element having transducing properties; and alternating-current signal-translating means connected to two opposing faces of said element having transducing properties for translating currents resulting from said mechanical strains applied through said drive means.

5. An electro-mechanical transducer comprising: an element having electro-mechanical transducing properties in the same sense as between an electric field in one coordinate direction in said element and mechanical strains in at least two other coordinate directions; an element having spaced points in at least said two other coordinate directions affixed to corresponding points of said first-mentioned element and forming a two-dimensional bow therewith; mounting means for one of said elements; alternating-current signal-translating means connected to two opposing faces of said first-mentioned element for effecting variations in the electric field within said transducing element in said one coordinate direction; and drive means affixed to the other of said elements at a point between said spaced points for delivering mechanical energy resulting from said variations in said electric field.

6. An electro-mechanical transducer comprising: a plate-like element of material having electro-mechanical transducing properties in the same sense as between an electric field in a coordinate direction through said plate and mechanical strains in said plate in at least two other coordinate directions, and vice versa; a cup-like element having spaced points in at least each of said two other coordinate directions affixed to corresponding points of said plate-like element and forming a two-dimensional bow therewith; mounting means for one of said elements; drive means affixed to the other of said elements at a point between said spaced points; and alternating-current signal-translating means connected to two opposing faces of said plate-like element for translating currents associated with said mechanical strains and electric field.

7. An electro-mechanical transducer comprising: a disk-shaped element of material having electro-mechanical transducing properties in the same sense as between an electric field in a transverse coordinate direction in said disk and mechanical strains in said disk in at least two other coordinate directions, and vice versa; a cup-shaped element having spaced points on its rim affixed to corresponding points of said disk; mounting means for one of said elements; drive means affixed to the other of said elements at a point between said spaced points; and alternating-current signal-translating means connected to two opposing faces of said disk for translating currents associated with said mechanical strains and electric field.

8. An electro-mechanical transducer comprising: a disk-shaped element of material having electro-mechanical transducing properties in the same sense as between an electric field in a transverse coordinate direction in said disk and mechanical strains in said disk in at least two other coordinate directions, and vice versa; a cup-shaped element having slits therein and having spaced points on its rim affixed to corresponding points of said disk to form a two-dimensional bow therewith; mounting means for one of said elements; drive means affixed to the other of said elements at a point between said spaced points; and alternating-current signal-translating means connected to two opposing faces of said disk for translating currents associated with said mechanical strains and electric field.

9. An electro-mechanical transducer comprising: an element of titanate material having electro-mechanical transducing properties in the same sense as between mechanical strains in said element in at least two coordinate directions and a resultant electric field in another coordinate direction, and vice versa; an element having spaced points in at least each of said two coordinate directions affixed to corresponding points of said first-mentioned element and forming a two-dimensional bow therewith; mounting means for one of said elements; drive means affixed to the other of said elements at a point between said spaced points; and alternating-current signal-translating means connected to two opposing faces of said first-mentioned element for translating currents associated with said mechanical strains and electric field.

10. An electro-mechanical transducer comprising: an element of barium titanate material having electro-mechanical transducing properties in the same sense as between mechanical strains in said element in at least two coordinate directions and a resultant electric field in another coordinate direction, and vice versa; an element having spaced points in at least each of said two coordinate directions affixed to corresponding points of said first-mentioned element and forming a two-dimensional bow therewith; mounting means for one of said elements; drive means affixed to the other of said elements at a point between said spaced points; and alternating-current signal-translating means connected to two opposing faces of said first-mentioned element for translating currents associated with said mechanical strains and electric field.

11. An electro-mechanical transducer comprising: an element of barium titanate material with a substantial amount of strontium titanate therein and having electro-mechanical transducing properties in the same sense as between mechanical strains in said element in at least two coordinate directions and a resultant electric field in another coordinate direction, and vice versa; an element having spaced points in at least each of said two coordinate directions affixed to corresponding points of said first-mentioned element and forming a two-dimensional bow therewith; mounting means for one of said elements; drive means affixed to the other of said elements at a point between said spaced points; and alternating-current signal-translating means connected to two opposing faces of said first-mentioned element for translating currents associated with said mechanical strains and electric field.

JOHN P. ARNDT, JR.

REFERENCES CITED

The following references are of record in the file of this patent:

UNITED STATES PATENTS

| Number | Name | Date |
| --- | --- | --- |
| 2,167,809 | Semple | Aug. 8, 1939 |
| 2,224,891 | Wright | Dec. 17, 1940 |
| 2,402,515 | Wainer | June 18, 1946 |
| 2,416,887 | Tibbetts | Mar. 4, 1947 |